Aug. 16, 1938.  W. S. BOARD  2,127,284
PIPE COUPLING
Filed Jan. 18, 1937
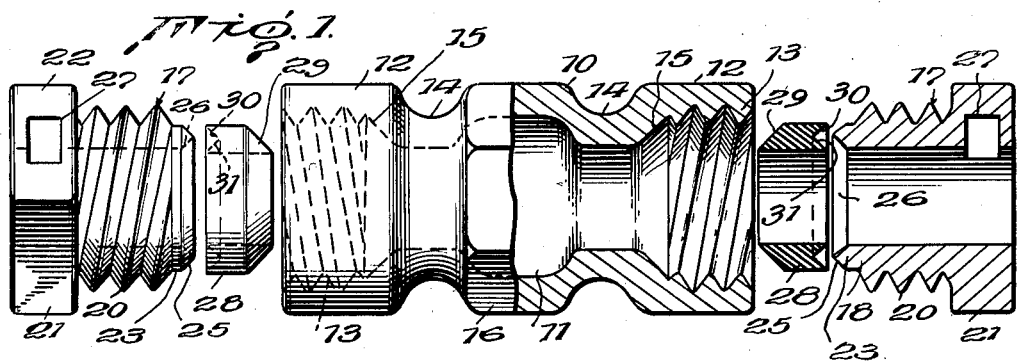
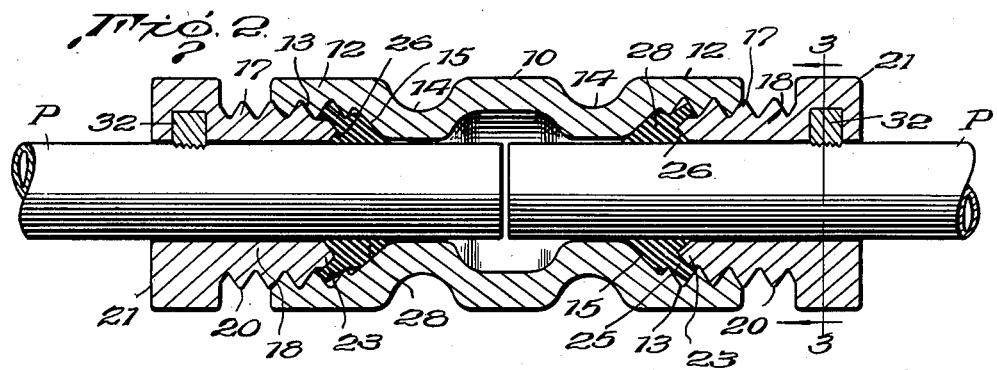
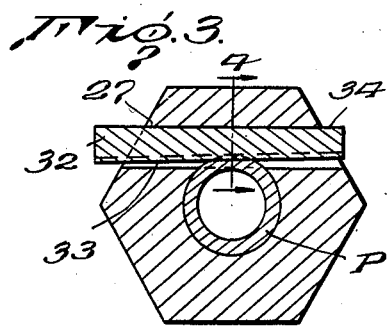
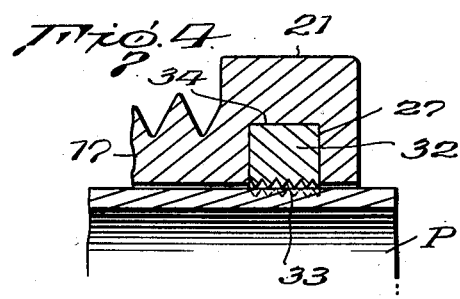
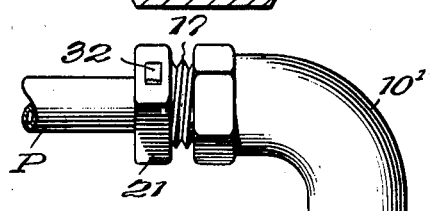
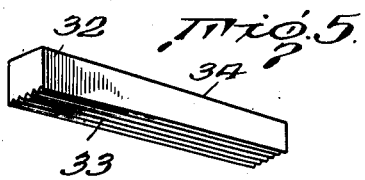
Inventor
William S. Board,
By John R. Fowler
Attorney Patented Aug. 16, 1938

2,127,284

UNITED STATES PATENT OFFICE 2,127,284

PIPE COUPLING

William S. Board, Middleport, Ohio

Application January 18, 1937, Serial No. 121,201

4 Claims. (Cl. 285—196)

This invention relates to pipe couplings and more particularly to couplings for securing the meeting or adjacent ends of pipes or pipe sections in a line or system without the necessity of treating said pipes or sections or the removal of the same from their fastenings.

Water and other pipe lines are frequently laid under ground and also at times positioned in relatively inaccessible places. When a break occurs in a buried water pipe line the resulting leak produces a mud bed around the pipe, and, consequently, in repairing the pipe it is necessary to work under severe handicaps. When employing existing commercial couplings, great difficulty is encountered in aligning and matching the accurately machined components of such couplings and in positioning the couplings on the muddy and sometimes inaccessible pipes. Furthermore, the expense entailed in the employment of machine threaded and finished couplings is objectionable, consequently, engineers and designers are lending their efforts to produce an effective but more economical coupling for commercial employment in repairing pipe lines or systems. Another disadvantage of employing known commercial machined pipe couplings in repairing a leaky pipe line resides in the fact that it is usually necessary to remove a pipe section and thread the repaired pipe line while working under great difficulties, due to the muddy condition of the soil in which the pipe is embedded, and, also, due to the relatively inaccessible location in which the break frequently occurs. Furthermore, when it is necessary to disassemble known commercial couplings preparatory to severing a line at the leak or coupling point for repairs or for other reasons, great difficulty is encountered owing to the corroded condition of the accurately fitting components, and it is frequently necessary to destroy the entire coupling in removing it.

In addition to the demand for economical means for facilitating repairs to pipe lines or systems, there is also a definite commercial demand for economical couplings which will facilitate the uniting of new pipe sections in the installation of pipe lines or systems, therefore, an object of this invention is to provide improved pipe couplings which may be economically manufactured and which are constructed and arranged to facilitate the uniting or assembling of separate pipes or pipe sections in the installation of pipe systems, and for conveniently and expeditiously uniting the separate sections of a broken pipe.

Another object of this invention is to provide a pipe coupling having separate threadedly-connected components which are preferably cast in their final form, and resilient members interposed between the threadedly connected members for producing a leak-tight joint around the unthreaded terminals of adjacent pipe sections.

An additional object of this invention is to provide a pipe coupling formed of separate threadedly-connected components which are arranged to engage yieldable gaskets which clamp around the meeting terminals of separate pipe sections to produce leak-tight joints therearound, and certain of the components being provided to receive wedges or locking members for securing these components to the pipe line thereby locking the threadedly engaged components against movement relative to each other.

Another object of this invention is to provide a pipe coupling having separate cooperating components which may be readily secured to a leaky pipe line by simply sawing the line at the point of leak to provide separate abutting terminals and then positioning the coupling around the adjacent pipe terminals and securing its cooperating components to each other to thereby produce a leak-tight joint around the abutting terminals of the repaired pipe line.

A more specific object of this invention is to provide an improved pipe coupling including a tubular body or sleeve for the reception of adjacent terminals of pipes or pipe sections, glands threadedly secured to and within the opposed terminals of the body or sleeve, yieldable annular gaskets of novel construction received within the body and positioned between annular portions of the body and annular terminals of the glands to produce leak-tight joints around the pipe sections when the glands are screwed to clamping position on the sleeve, and locking wedges operably engaging the glands and the pipe sections to securely lock the coupling components on the pipe sections.

It is also an object of this invention to provide a pipe coupling of generally improved construction and arrangement, whereby the device will be simple, durable and inexpensive in construction as well as convenient, practical, serviceable and efficient in its use.

With the foregoing and other objects in view, which will appear as the description proceeds, the invention resides in the combination and arrangement of parts, and in the details of construction hereinafter described in the claims, it being understood that various changes in form, proportion and minor details of construction may be resorted to without departing from the spirit or sacrificing any advantages of the invention.

For a complete disclosure of the invention, a detailed description of my improved pipe coupling will now be given in connection with the accompanying drawing forming a part of the specification, wherein:

Figure 1 is an elevational view depicting the separate components of the pipe coupling in disassembled relation, certain of the components appearing in section, Figure 2 is a longitudinal sectional view showing the coupling components in assembled relation on adjacent pipe sections, Figure 3 is a transverse sectional view taken on the line 3—3 of Figure 2, looking in the direction indicated by the arrows, Figure 4 is an enlarged fragmental sectional view taken on the line 4—4 of Figure 3, depicting the locking wedge in initial inserted position in full lines and in locking position in dotted lines, Figure 5 is a perspective view of the locking wedge, and Figure 6 is an elevational view depicting the coupling in the form of an elbow.

Referring now to the drawing in which similar reference characters designate corresponding parts, 10 indicates a tubular body member or sleeve having an enlarged central portion 11 and enlarged terminal portions 12. The enlarged terminal portions are internally threaded to provide relatively large threads 13 which are preferably cast in their final form and the threads in both enlarged terminals 12 are disposed in the same sense or direction to, preferably, provide right-hand threads. Restricted tubular portions or necks 14 are interposed between the enlarged central portion 11 and enlarged terminals 12, and the outer portion of the enlarged central portion 11 is shaped to provide polygonal wrench-engaging surfaces 16, for a purpose to be hereinafter disclosed. A frusto-conical seat or surface 15 is interposed between the inner surface of each reduced neck 14 and the threaded internal surface of the enlarged portion 12 and the function of these frusto-conical surfaces will be hereinafter disclosed.

Glands 17 are provided and each gland includes a tubular portion 18 which is externally threaded to provide relatively large threads 20 which are preferably cast in their final form and are constructed and arranged to threadedly engage the threads 13 of the sleeve for a purpose to be hereinafter set forth. The outer terminal of each gland 17 is provided with a radially extending flange or head 21, and the outer surface of this flange may be shaped to provide polygonal wrench-engaging surfaces 22, or, if preferred, this surface may be of cylindrical configuration for cooperation with a spanner wrench, as will be hereinafter disclosed. The tubular portion 18 of each gland 17 extends axially beyond the threads 20 to provide a short tubular or cylindrical extension 23, and the outer terminal of each extension 23 is shaped to provide annular beveled surfaces 25 and 26 which extend from the outer and inner peripheral surfaces of the tubular extension 23 and meet at a point intermediate these peripheral surfaces. An aperture or slot 27 extends tangentially through the enlarged head 21 of each gland 17 for a purpose to be hereinafter explained. Although only one slot 27 is depicted for each gland 17 it is to be understood that as many slots as desired or convenient may be provided.

Yieldable gaskets 28 are provided for reception within the sleeve 10 and cooperable engagement with the beveled terminal surfaces 25 and 26 of the tubular portions 18 of the glands 17, as will be hereinafter disclosed. Each gasket 28 is preferably formed of lead, rubber or any other suitable yieldable material, and it is shaped to provide an annular or cylindrical body having one terminal tapered inwardly from its outer cylindrical surface to its inner cylindrical surface to provide a frusto-conical surface 30. The opposed terminal of each gasket 28 is provided with double beveled portions which extend outwardly from a point intermediate the inner and outer surfaces of the gasket to define angularly disposed frusto-conical surfaces 30 and 31.

Locking members or wedges 32 are provided to be operably received within the slots 27 which are formed in the enlarged head or flange 21 of the glands 17, and each wedge 32 is provided with a toothed or serrated surface 33 and an opposed inclined or angularly disposed surface 34 which surfaces operably engage the glands and the pipe sections, as will be hereinafter explained.

In order to assemble the complete coupling for use, the gaskets 28 are positioned within the enlarged threaded portions 12 of the body member or sleeve 10 and then the glands are positioned within the sleeve so that the threads 20 of the glands loosely engage the threads 13 of the enlarged female portions of the sleeve.

To apply the improved coupling to separate adjacent pipe sections P, the entire loosely assembled coupling is readily slid over the end of one of the pipe sections P. To permit this, one of the pipe sections is moved from axial alinement with the other so that the loosely assembled coupling may be passed over its end. The pipes are then placed in axial alinement and the coupling is then slid along its supporting pipe over the adjacent pipe so that the adjacent ends of the pipe sections P are preferably positioned centrally of the coupling. Then a suitable wrench is placed in engagement with the wrench-engaging flange 21 of each gland, and, by moving these wrenches relative to each other, the helical threads 20 of the glands 17 travel around the helical threads 13 of the enlarged terminal portions of the sleeve or body 10 until the tapered annular surfaces 25 and 26 of each gland engage the tapered or frusto-conical or annular surfaces 30 and 31 of its gasket 28. Further inward movement of the glands 17 causes the tapered or frusto-conical surfaces 30 of each gasket 28 to be forced against a frusto-conical surface 15 of the sleeve 10, so that the inner cylindrical portion of the gasket 28 is forced against the outer surface of the pipe, as shown in Figure 2, to produce a leak-tight joint between the outer surface of the pipe P and the gasket, and a similar joint between the frusto-conical seat or surfaces 15 of the sleeve and the tapered or frusto-conical surfaces 30 of the gasket. At the same time the tapered annular or frusto-conical surfaces 25 and 26 of each gland 17 engage the frusto-conical surfaces 30 and 31 of the engaged gasket and force the outer terminals of the gasket 28 to spread both inwardly and outwardly to provide a leak-tight joint around its pipe section, and also a similar joint between the gasket and the inner threaded surfaces of the engaged enlargements 12. After the glands 17 have been screwed within the sleeve 10 sufficiently to spread the gaskets 28 to produce the leak-tight joints, then the glands are readily locked to the pipe sections by simply positioning a wedge 32 in a slot 27, with the teeth 33 of the wedges in engagement with the pipe sections. The wedges are then driven into the slots 27 until the threads cut into the pipe sections, as indicated in Figure 4 of the drawing, thereby locking the glands securely to the pipe sections, and, consequently, securely locking the entire coupling in assembled condition, as illustrated in Figure 2. Inasmuch as the sleeve 10 and cooperating glands 17 are preferably cast in final form with relatively large threads so proportioned so that the threads 20 of the glands 17 are readily received within the enlarged portions 12 of the sleeve for engagement with the threads 13 of the sleeve, it is manifest that this coupling can be economically manufactured, conveniently and expeditiously applied to the adjacent terminals of separate pipes for separate pipe sections. When installing a new pipe system the coupling may be readily applied to adjacent pipe sections P, as hereinafter disclosed, or, if the coupling is to be employed in repairing a damaged or leaky pipe, the pipe is sawed at the point of its impairment or leak to produce separate pipe sections, as shown in Figure 2, and the coupling may be readily applied to the separate pipe sections as above disclosed. When applying the coupling to pipe sections P which are positioned for inconvenient access, a gland 17 may be positioned on one pipe section P, and the sleeve and the other gland may be positioned in loosely assembled condition on the opposed pipe section P. Inasmuch as the relatively large threads 20 of each gland 17 loosely engage the relatively large threads 13 of the sleeve 10, the gland which is positioned on one pipe section may be readily screwed into the sleeve supported by the other pipe sections without accurately alining the pipes, there being sufficient play between the gland 17 and the sleeve terminal 12 to permit the initial engagement of the threads 13 and 20 without accurate alinement. This arrangement saves considerable time when applying the coupling to pipes which are positioned in muddy soil or which are so located as to prevent their accurate alinement, because the components of the coupling may be assembled without the necessity of accurately alining the separate pipe sections P.

In order to remove the coupling from the pipe sections P, the wedges 32 are driven from the slot 27, and then suitable wrenches are placed on the wrench-engaging flanges 21 of the glands 17 and moved in opposed directions to unscrew the glands 17 from the sleeve 10. After one of the glands 17 has been removed, the wrench is then removed from its surface and positioned on the wrench-engaging surface 16 of the sleeve 10, so that the remaining gland 17 may be unscrewed, thus disassembling the entire coupling preparatory to its removal from the pipe line or pipe sections. Inasmuch as the flanges 21 of the glands 17 are provided with one of the slots 27, it is manifest that, if desired, spanner wrenches may be employed on these glands, and if a spanner is employed, the nose of the conventional spanner wrench, not shown, may be positioned in the slot or slots 27.

In the form of the invention depicted in Figure 6, the components of the coupling are similar in construction to the form disclosed in Figures 1 to 5, inclusive, except that the body member 10' is shaped to form an elbow or L-coupling for the reception of angularly disposed pipe sections P.

With this arrangement pipes which are disposed at an angle to each other may be conveniently coupled together, or damaged or leaky elbows or L joints may be removed and this coupling expeditiously and conveniently substituted. It is also to be understood that the construction herein disclosed may be employed in any desired form or shaped coupling within the scope of this invention.

Having thus described my invention what I claim as new and useful is:

1. A pipe coupling including a sleeve to receive adjacent terminals of separate pipe sections therein, the opposed terminals of the sleeve being threaded, cylindrical glands threadedly secured to the terminals of the sleeve around the pipe sections and each gland having opposed angularly-disposed frusto-conical surfaces formed at one terminal thereof which intersect intermediate the inner and outer peripheral surfaces of the cylindrical gland, yieldable annular gaskets received within the sleeve and engaging portions of the sleeve and having opposed angularly-disposed frusto-conical surfaces which intersect intermediate the inner and outer surfaces of the gasket to be engaged by the said opposed frusto-conical surfaces of the gland to simultaneously spread the gaskets inwardly and outwardly as the glands are screwed towards the sleeve to thereby cause the spread portions of the gaskets to engage the outer surfaces of the pipe sections and the inner surface of the sleeve to form leak-tight joints within the sleeve around the pipe sections.

2. A pipe coupling including a sleeve to receive adjacent terminals of separate pipe sections therein, the opposed terminals of the sleeve being internally threaded and having inclined gasket-engaging surfaces, tubular glands having internal threads formed therein, the glands being received within the terminals of the sleeve around the pipe sections and the external threads of the glands operably engaging the threads of the sleeve, two opposed angularly-disposed frusto-conical gasket-engaging surfaces formed in the inner terminal of each gland, yieldable gaskets received within the sleeve and engaging the gasket-engaging surfaces of the sleeve and having two opposed angularly-disposed frusto-conical surfaces, the said gasket-engaging surfaces of the glands engaging the frusto-conical surfaces of the gaskets to simultaneously spread the gaskets inwardly and outwardly as the glands are screwed towards the sleeve to thereby cause the spread portions of the gaskets to engage the outer surfaces of the pipe sections and the inner surface of the sleeve to form a leak-tight joint within the sleeve around the pipe sections.

3. A pipe coupling including a sleeve, the opposed terminals of the sleeve being internally threaded and having gasket-engaging surfaces, tubular glands having external threads, the glands being received within the terminals of the sleeve around the pipe sections and the external threads of the glands operably engaging the internal threads of the sleeve, two angularly-disposed frusto-conical surfaces formed at the inner terminal of each gland, yieldable cylindrical gaskets received within the sleeve around the pipe sections and each gasket having two angularly-disposed frusto-conical surfaces extending from the inner and outer cylindrical surfaces of the gasket and meeting at its intermediate portion so that the frusto-conical surfaces of the glands engage the frusto-conical surfaces of the gaskets to spread the gaskets inwardly and outwardly to thereby cause the spread portions of the gaskets to engage the outer surface of the pipe sections and the inner surface of the sleeve to form a leak-tight joint within the sleeve around the pipe sections.

4. A pipe coupling including a threaded sleeve having frusto-conical gasket-engaging surfaces formed therein, tubular threaded glands received within the terminals of the sleeve around the pipe sections and the threads of the glands engaging the threads of the sleeve, two angularly-disposed frusto-conical surfaces formed at the inner terminal of each gland, yieldable cylindrical gaskets received within the sleeve around the pipe sections and each gasket being provided at one terminal with two angularly-disposed frusto-conical surfaces, and with a single frusto-conical surface at the opposed terminal of the gasket, the said frusto-conical surfaces of the glands engaging the angularly disposed frusto-conical surfaces of the gaskets to spread each gasket inwardly and outwardly to engage the outer surface of each pipe section and the inner surface of the sleeve and the opposed single frusto-conical surface of each gasket engaging the cooperating frusto-conical surface of the sleeve to force this portion of each gasket into engagement with the outer surface of each pipe section.

WILLIAM S. BOARD.